United States Patent
Elie-Dit-Cosaque et al.

(10) Patent No.: US 7,697,440 B2
(45) Date of Patent: Apr. 13, 2010

(54) SCALABLE SELECTIVE ALARM SUPPRESSION FOR DATA COMMUNICATION NETWORK

(75) Inventors: David Elie-Dit-Cosaque, Richardson, TX (US); Atiya Suhail, Plano, TX (US); Oscar Rodriguez, Madrid (ES); Kamakshi Sridhar, Plano, TX (US)

(73) Assignee: Alcatel Lucent, Paris (FR)

( * ) Notice: Subject to any disclaimer, the term of this patent is extended or adjusted under 35 U.S.C. 154(b) by 911 days.

(21) Appl. No.: 11/380,825

(22) Filed: Apr. 28, 2006

(65) Prior Publication Data

US 2007/0115837 A1  May 24, 2007

Related U.S. Application Data

(60) Provisional application No. 60/691,491, filed on Jun. 17, 2005, provisional application No. 60/699,678, filed on Jul. 15, 2005, provisional application No. 60/708,815, filed on Aug. 16, 2005.

(51) Int. Cl.
*H04L 12/26* (2006.01)
(52) U.S. Cl. ..................... 370/241; 370/252
(58) Field of Classification Search ............ None
See application file for complete search history.

(56) References Cited

U.S. PATENT DOCUMENTS 6,239,699 B1   5/2001 Ronnen
2005/0083834 A1*  4/2005 Dunagan et al. ........... 370/221

OTHER PUBLICATIONS

Elie-Dit-Cosaque et al: "Review of 802.1ag framework" Internet Citation, Mar. 12, 2004, pp. 1-28 Retrieved from the Internet: URL:www.ieee802.org/1/files/public/docs200 4/Review%20of%20802.1ag%20framework1.pdf> on Sep. 26, 2005.
Dinesh M: "802.1AG Connectivity Fault Management Tutorial" Internet Citation, Jul. 12, 2004, pp. 1-24 Retrieved from the Internet: URL:http://grouper.ieee.org/groups/802/802_tutorials/july04/802. 1ag%20%2 0CFM%20Tutorial%20-%20Part%201%20v2.ppt> on Sep. 26, 2005.

* cited by examiner

*Primary Examiner*—Chi H Pham
*Assistant Examiner*—Fan Ng
(74) *Attorney, Agent, or Firm*—Garlick Harrison & Markison

(57) ABSTRACT

Scalable selective alarm suppression is achieved through a new class of management packet, such as a new class of Ethernet management frame, adapted to convey a reachability relationship between a lower level maintenance point and a single higher level maintenance point, and more particularly adapted to convey to a first higher level maintenance point that receives the packet an identity of a single second higher level maintenance point that will become unreachable to the first higher level maintenance point in the event of a loss of continuity involving the lower level maintenance point. Once the first higher level maintenance point has learned a totality of operative reachability relationships through receipt of such packets and is notified of a loss of continuity involving the lower level maintenance point, the first higher level maintenance point can reference the learned reachability relationships and readily determine under what circumstances it should suppress an alarm in response to a detected loss of continuity with a higher level maintenance point.

19 Claims, 11 Drawing Sheets

SCALABLE SELECTIVE ALARM SUPPRESSION FOR DATA COMMUNICATION NETWORK

CROSS-REFERENCE TO RELATED APPLICATION(S)

This application claims the benefit of U.S. provisional application Nos. 60/691,491, filed on Jun. 17, 2005, 60/699,678, filed on Jul. 15, 2005 and 60/708,815, filed on Aug. 16, 2005, all of which are entitled "Scalable Accurate AIS" and the contents of all of which are incorporated herein by reference.

BACKGROUND OF INVENTION

The present invention relates to fault reporting in data communication networks, and more particularly to scalable and accurate methods and systems for suppression of alarms in Ethernet networks.

Connectivity fault management (CFM) refers to the ability to monitor the health of a network. CFM in Ethernet networks has historically been performed by a network management system (NMS) running an application layer protocol such as Simple Network Management Protocol (SNMP). In a typical SNMP-based NMS, faults in an Ethernet network are detected by SNMP agents running on managed data communication nodes (e.g. nodes supporting Ethernet bridging capability) and reported to a central SNMP manager. Fault reports are typically made in response to individual polling of the SNMP agents, which can be cumbersome and slow in networks with large numbers of managed nodes. While SNMP agents may be configured to make unsolicited fault reports, for example, to send a fault notification to the SNMP manager in direct response to fault detection, they cannot send fault notifications if their managed nodes have experienced a catastrophic failure.

The inadequacy of SNMP-based NMS alone to deliver CFM in large Ethernet networks that often span a multiple of customer, provider and operator networks has led to development of a native Ethernet CFM solution that is more robust. This native Ethernet CFM solution, which is being standardized in a document styled IEEE 802.1ag and is hereinafter called "Ethernet CFM," provides proactive fault detection and reporting for bridged Ethernet networks through in-band transport of Ethernet management frames.

Operation of Ethernet CFM is shown by way of example in FIG. 1. A bridged Ethernet network 100 includes customer equipment CE1, CE2, CE3 in a customer network and provider equipment PE1, PE2 in a provider network. The customer and provider equipment include Ethernet bridging capability. Provider equipment PE1, PE2 is maintained by a service provider. Customer equipment CE1, CE2, CE3 is maintained by a customer of the service provider and CE1 communicates with CE2 and CE3 through provider equipment PE1 and PE2. The customer network further includes a customer network management system (CE NMS) 110 for monitoring faults in the customer network, while the provider network includes a provider network management system (PE NMS) 120 for monitoring faults in the provider network.

Maintenance associations (MA) are configured at different maintenance levels for performing CFM. In the example shown, a customer maintenance association (CMA) 115 is configured at a customer level to perform CFM in the customer network. CMA 115 includes maintenance endpoints (MEP) A, D, E and maintenance intermediate points (MIP) B, C. A provider maintenance association (PMA) 125 is configured at a provider level to perform CFM in the provider network. PMA 125 includes MEP F, G. MEP and MIP are software or hardware entities created on either a per-node or per-port basis. Generally speaking, MEP transmit and receive Ethernet management frames in their respective MA to detect faults which are selectively reported to an NMS so that corrective action can be taken. When a MEP detects a fault and reports the fault to NMS the MEP is said to raise an alarm. When a MEP detects a fault but does not report the fault to NMS the MEP is said to suppress an alarm.

MEP infer faults from loss of continuity with other MEP. In the example shown in FIG. 1, MEP G detects a fault on PMA 125 as a result of failing to receive a continuity check (CC) frame from MEP F. A CC frame is generally speaking a heartbeat message transmitted between MEP in a MA to confirm connectivity with the sending MEP. Detection of the fault causes MEP G to transmit a fault notification via SNMP to PE NMS 120 reporting the fault. Detection of the fault also causes MEP G to transmit an alarm indication signal (AIS) frame in CMA 115 to notify MEP D and MEP E of a lower level fault and thereby cause suppression of an alarm in CMA 115. Were the AIS frame not transmitted in CMA 115, MEP D and MEP E would detect the same fault through failure to receive a CC frame from MEP A and would report the fault to CE NMS 110 even though CE NMS 110 has no operational control over the provider network where the fault exists. Since the AIS frame is transmitted in CMA 115, MEP D and MEP E suppress the alarm in CMA 115 and refrain from making a superfluous report to CE NMS 110.

One problem with Ethernet CFM alarm suppression as generally described above is its accuracy when distinct faults are detected in MA operating at different levels, such as PMA 125 and CMA 115. Consider the situation where a lower level fault is detected in PMA 125 between MEP F and MEP G and a higher level fault is then detected in CMA 115 between MEP D and MEP E. When that occurs, an AIS frame transmitted by MEP G in CMA 115 should ideally inhibit reporting to CE NMS 110 of the lower level fault (over which CE NMS 110 has no operational control) but should not inhibit reporting to CE NMS 110 of the higher level fault (over which CE NMS 110 has operational control). One possible solution to this problem resides in providing to MEP D and MEP E a reachability relationship from which they can discern that higher level MEP A becomes unreachable as a result of a fault involving lower level MEP F. With knowledge of such a reachability relationship, MEP D and MEP E can suppress an alarm resulting from failure to receive CC frames from MEP A while raising an alarm resulting from failure to receive CC frames from one another.

One known implementation of Ethernet CFM alarm suppression, called nonselective AIS, fails to provide reachability relationships and therefore does not address the problem of distinct faults on multiple levels. Instead, all alarms are suppressed at a higher level in response to an AIS frame received from a lower level.

Other known implementations of Ethernet CFM alarm suppression, called selective AIS, do not scale well. In one selective alarm suppression implementation, a lower level MEP snoops CC frames transmitted by higher level MEP to learn which higher level MEP will become unreachable to other higher level MEP in the event of a fault involving the lower level MEP. The lower level MEP transmits a complete list of conditionally unreachable higher level MEP in a CC frame sent to another lower level MEP. In the event of a fault involving the lower level MEP, the lower level MEP that received the list transmits to the other higher level MEP in an AIS frame the complete list of conditionally unreachable higher level MEP so that other higher level MEP can suppress alarms resulting from failure to receive CC frames from the higher level MEP in the list. In networks with large numbers of MEP, this complete list of conditionally unreachable MEP transmitted in CC and AIS frames can have an extremely high bit count and cause such frames to violate the maximum transfer unit (MTU) size for Ethernet.

SUMMARY OF THE INVENTION

The present invention, in a basic feature, provides scalable selective alarm suppression for a data communication network, such as an Ethernet network. Scalable selective alarm suppression may be achieved through a new class of management packet, such as a new class of Ethernet management frame, adapted to convey a reachability relationship between a lower level maintenance point and a single higher level maintenance point, and more particularly adapted to convey to a first higher level maintenance point that receives the packet an identity of a single second higher level maintenance point that will become unreachable to the first higher level maintenance point in the event of a loss of continuity involving the lower level maintenance point. Once the first higher level maintenance point has learned a totality of operative reachability relationships through such packets and is notified of a loss of continuity involving the lower level maintenance point, the first higher level maintenance point can reference the learned reachability relationships and readily determine under what circumstances it should suppress an alarm in response to a detected loss of continuity with a higher level maintenance point.

In one aspect, a method for selective alarm suppression in a data communication network comprises: storing a plurality of reachability relationships between a first maintenance point and a respective plurality second maintenance points in response to a respective plurality of management packets; detecting a first loss of continuity respecting the first maintenance point; detecting a second loss of continuity respecting a third maintenance point; and determining whether to raise an alarm respecting the second loss of continuity based at least in part on whether the third maintenance point is one of the plurality of second maintenance points.

In another aspect, a data communication node adapted for selective alarm suppression has an interface, a memory and a management entity adapted to perform the method.

In another aspect, a method for selective alarm suppression in a data communication network comprises: receiving a first management packet including a first identity of a first maintenance point and a second identity of a second maintenance point; storing a reachability relationship between the first maintenance point and the second maintenance point in response to the first management packet; receiving a second management packet indicating a first loss of continuity respecting the first maintenance point; detecting a second loss of continuity respecting a third maintenance point based at least in part on failure to receive a third management packet within an expected time; and using the reachability relationship to determine whether to raise an alarm respecting the second loss of continuity.

In another aspect, a method for facilitating selective alarm suppression in a data communication network comprises generating a management packet including a first identity of a first maintenance point and a second identity of a second maintenance point; and transmitting the management packet to a third maintenance point adapted to store a reachability relationship between the first maintenance point and the second maintenance point in response to the management packet and use the reachability relationship to determine whether to raise an alarm respecting a loss of continuity detected regarding a fourth maintenance point.

In yet another aspect, a data communication node adapted to facilitate selective alarm suppression in a data communication network comprises a first interface adapted to receive a management packet having a second identity of a second maintenance point; a management entity adapted to store a first identity of a first maintenance point in the management packet; and a second interface adapted to transmit the management packet to a third maintenance point adapted to store a reachability relationship between the first maintenance point and the second maintenance point in response to the management packet and use the reachability relationship to determine whether to raise an alarm respecting a loss of continuity detected regarding a third maintenance point.

These and other aspects of the invention will be better understood by reference to the following detailed description taken in conjunction with the drawings that are briefly described below. Of course, the invention is defined by the appended claims.

DETAILED DESCRIPTION OF THE PREFERRED EMBODIMENT

It has been mentioned already that selective alarm suppression may be achieved through learning by a higher level maintenance point of a totality of reachability relationships between a lower level maintenance point and other higher level maintenance points, and more particularly learning by a higher level maintenance point of the identity of other higher level maintenance points that will become unreachable in the event of a loss of continuity involving the lower level maintenance point. In one embodiment of the invention, scalable selective alarm suppression is realized through one or more novel Ethernet management frames, herein called support AIS (S-AIS) frames, received by a higher level maintenance point prior to the loss of continuity and each adapted to convey a reachability relationship between a lower level maintenance point and a single higher level maintenance point.

Figure 1:
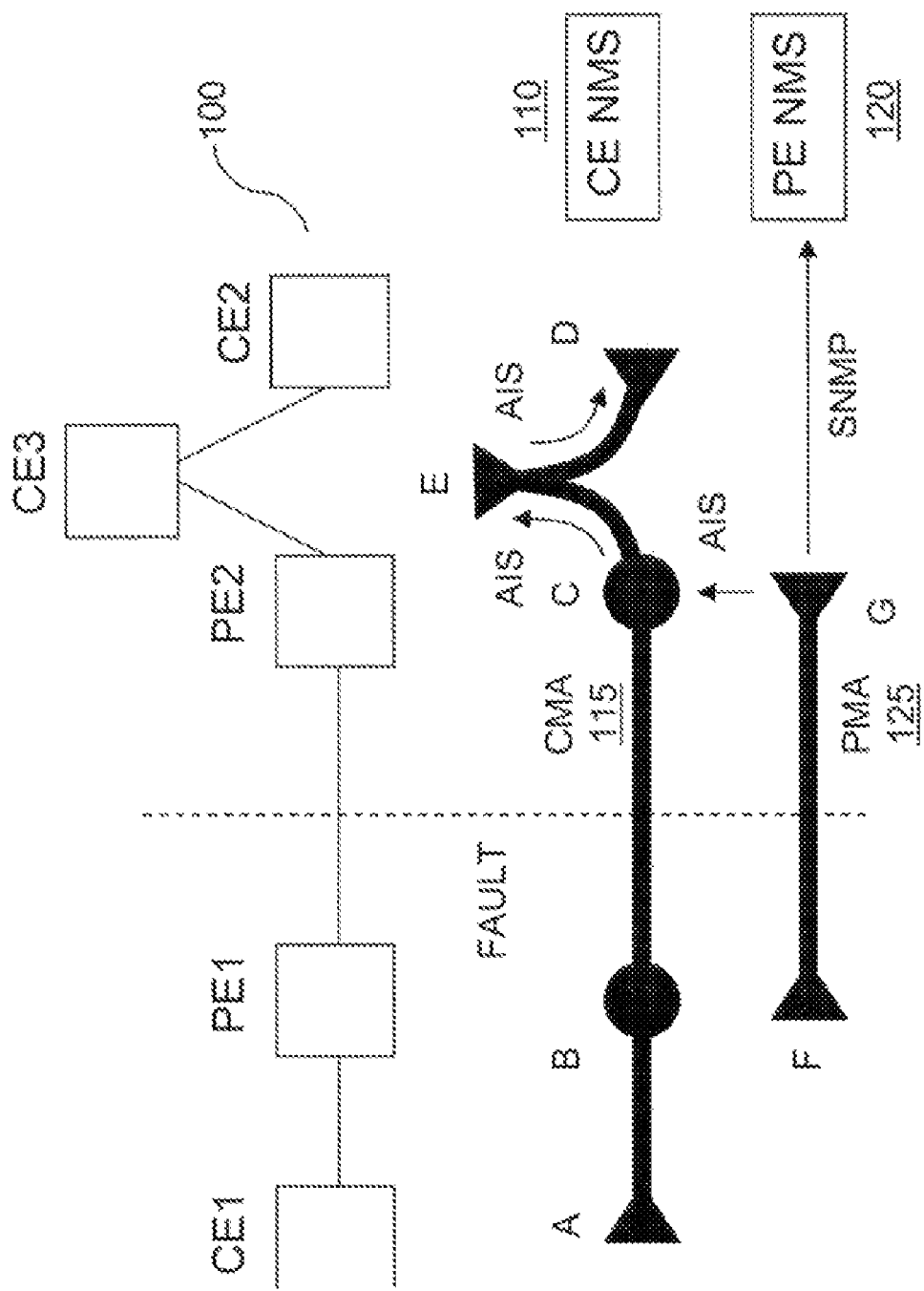
FIG. 1 shows a network running Ethernet CFM.
Figure 2:
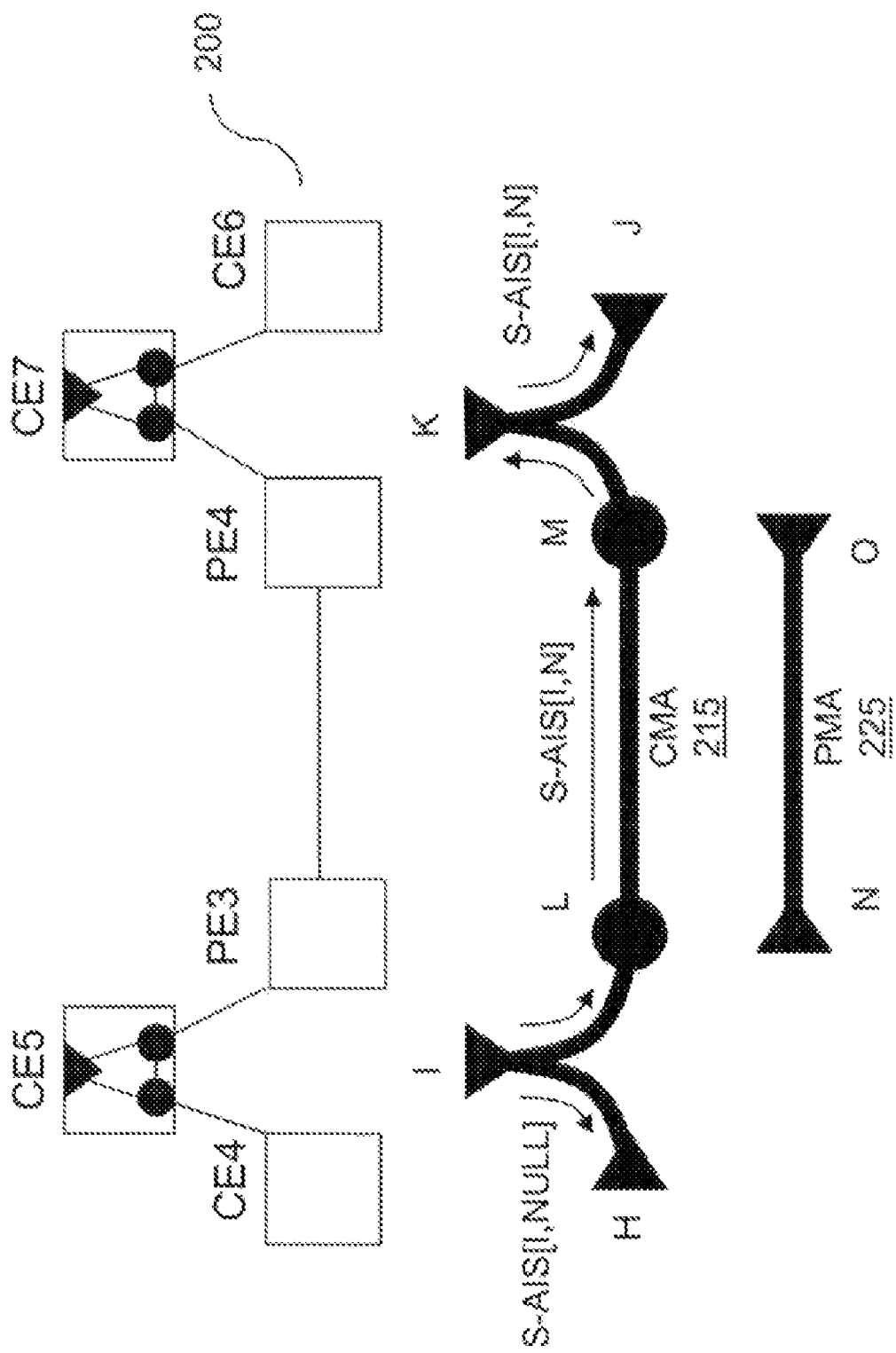
FIG. 2 shows a path of an exemplary support AIS (S-AIS) frame in a network running Ethernet CFM in one embodiment of the invention.

In FIG. 2, a path of such an S-AIS frame in a network 200 running Ethernet CFM is shown in one embodiment. Network 200 includes customer equipment CE4, CE5, CE6, CE7 in a customer network and provider equipment PE3, PE4 in a provider network. The customer and provider equipment are data communication nodes, such as Ethernet switches, that have interfaces for transmitting and receiving message packets, such as Ethernet data and management frames, and that support Ethernet bridging capability and maintenance entities in custom logic, software or a combination thereof. Provider equipment PE3, PE4 is maintained by a service provider. Customer equipment CE4, CE5, CE6, CE7 is maintained by a customer of the service provider. CE4, CE5 communicate with CE6, CE7 through provider equipment PE3, PE4. Maintenance associations (MA) are configured at different maintenance levels for performing CFM. Customer maintenance association (CMA) 215 is configured at a customer level to perform CFM in the customer network. CMA 215 includes maintenance endpoints (MEP) H, I, J, K denoted by triangles and maintenance intermediate points (MIP) L, M denoted by circles which are operative on CE4, CE5, CE6, CE7 and PE3, PE4, respectively. Provider maintenance association (PMA) 225 is configured at a provider level to perform CFM in the provider network. PMA 225 includes MEP N, O operative on PE3, PE4, respectively. MEP and MIP are custom logic, software or hybrid hardware/software implemented entities created on either a per-node or per-port basis. For example, it can be seen that MEP I and MEP K are configured on ports of CE5 and CE7, respectively. MEP transmit and receive Ethernet management frames in their respective MA to detect faults which are selectively reported to a network management system (NMS) so that corrective action can be taken. MIP passively relay certain types of Ethernet management frames received from MEP, for example CC frames, and respond to other types of Ethernet management frames, such as loopback and link trace frames.

An S-AIS frame is a message type transmitted reciprocally and non-periodically between each MEP pair in a MA to learn the identity of a lower level MEP, if any, between each sending MEP and receiving MEP. Based on S-AIS frames received from the totality of other MEP, each MEP can learn reachability relationships between all other same-level MEP and lower level MEP. An S-AIS frame is transmitted by an MEP when it is initialized, detects a topology change through a CC/AIS contradiction, receives an S-AIS frame from a new MEP or receives an S-AIS frame with new information. In some embodiments, a sending MEP originates an S-AIS frame with a source MEP identifier field (S-MEP ID) identifying itself and a below MEP identifier field (B-MEP ID) that is initially null. A first receiving MIP, if any, having an associated lower level MEP inserts the lower level MEP identity into B-MEP ID and relays the frame to one or more receiving MEP. The receiving MEP each record a reachability relationship for the sending MEP that identifies the lower level MEP (identified in B-MEP ID) as resident between the sending MEP (identified in S-MEP ID) and the receiving MEP. Through analysis of the totality of received S-AIS frames in the foregoing manner, each higher level MEP advantageously learns, for each lower level MEP, the group of higher level MEP that will become unreachable in the event of a loss of continuity involving the lower level MEP.

In other embodiments, the S-AIS frame type may be originated by an MIP through modification of a CC frame type originated by an MEP to include B-MEP ID identifying a below MEP. In these embodiments, MEP do not originate S-AIS with B-MEP ID that is initially null.

In some embodiments, S-AIS frame transmission proceeds as follows in the example shown in FIG. 2. MEP I originates an S-AIS frame with an S-MEP ID identifying itself and a B-MEP ID that is initially null. MEP I multicasts the frame to adjacent maintenance points MEP H and MIP L. MEP H records a null reachability relationship for MEP I. For example, in one embodiment, MEP H stores or updates an entry for MEP I in a reachability table on CE4 indicating that there is no MEP in PMA 225 resident between MEP H and MEP I. MIP L, on the other hand, has an associated MEP at a lower level. Thus, MIP L inserts the identity of MEP N in B-MEP ID and relays the frame to MEP J and MEP K. MEP J and MEP K each record a non-null reachability relationship for MEP I. For example, in one embodiment, MEP J stores or updates an entry for MEP I in a reachability table on CE6 indicating that MEP N in PMA 225 is resident between MEP J and MEP I. Similarly, MEP K stores or updates an entry for MEP I in a reachability table on CE7 indicating that MEP N in PMA 225 is resident between MEP K and MEP I. Reachability tables may be implemented in a random access memory (RAM).

Figure 3:
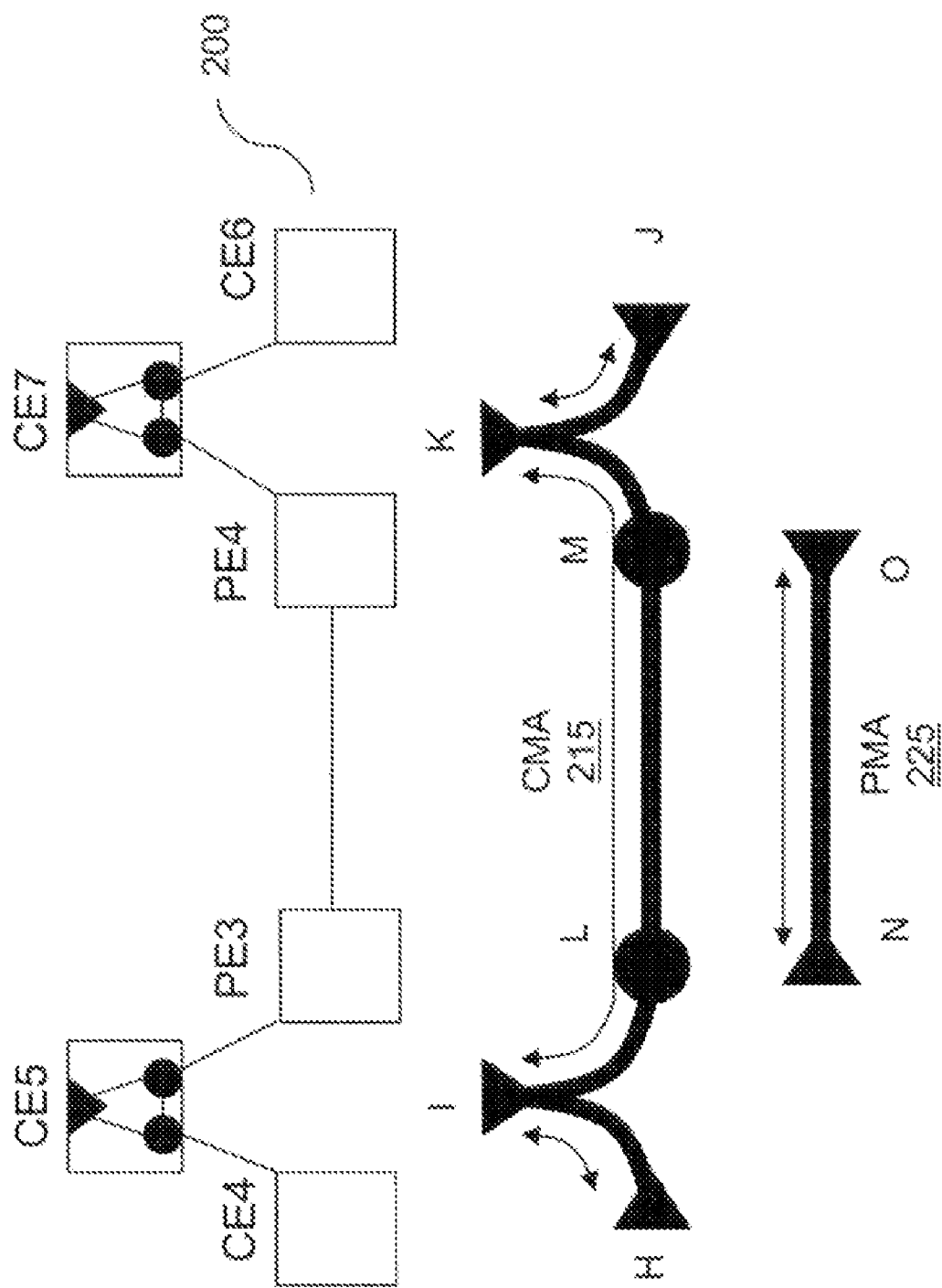
FIG. 3 shows paths of exemplary continuity check (CC) frames in a network running Ethernet CFM in one embodiment of the invention.

Turning to FIG. 3, paths of continuity check (CC) frames in network 200 are shown in one embodiment. A CC frame is a message type transmitted reciprocally and periodically between each MEP pair in a MA to confirm continued connectivity with the sending MEP. MIP passively relay CC frames. For example, MEP I originates a CC frame with its identity in S-MEP ID. MEP I multicasts the frame to adjacent maintenance points MEP H and MIP L. MEP H records receipt of the CC frame from MEP I and resets a timer. MIP L passively relays the CC frame to MEP J and MEP K via MIP M whereat MEP J and MEP K in similar fashion record receipt and reset timers. The process is repeated periodically on CMA 215 and PMA 215 to confirm continued connectivity between all same-level MEP over the operational cycle of network 200.

Figure 4:
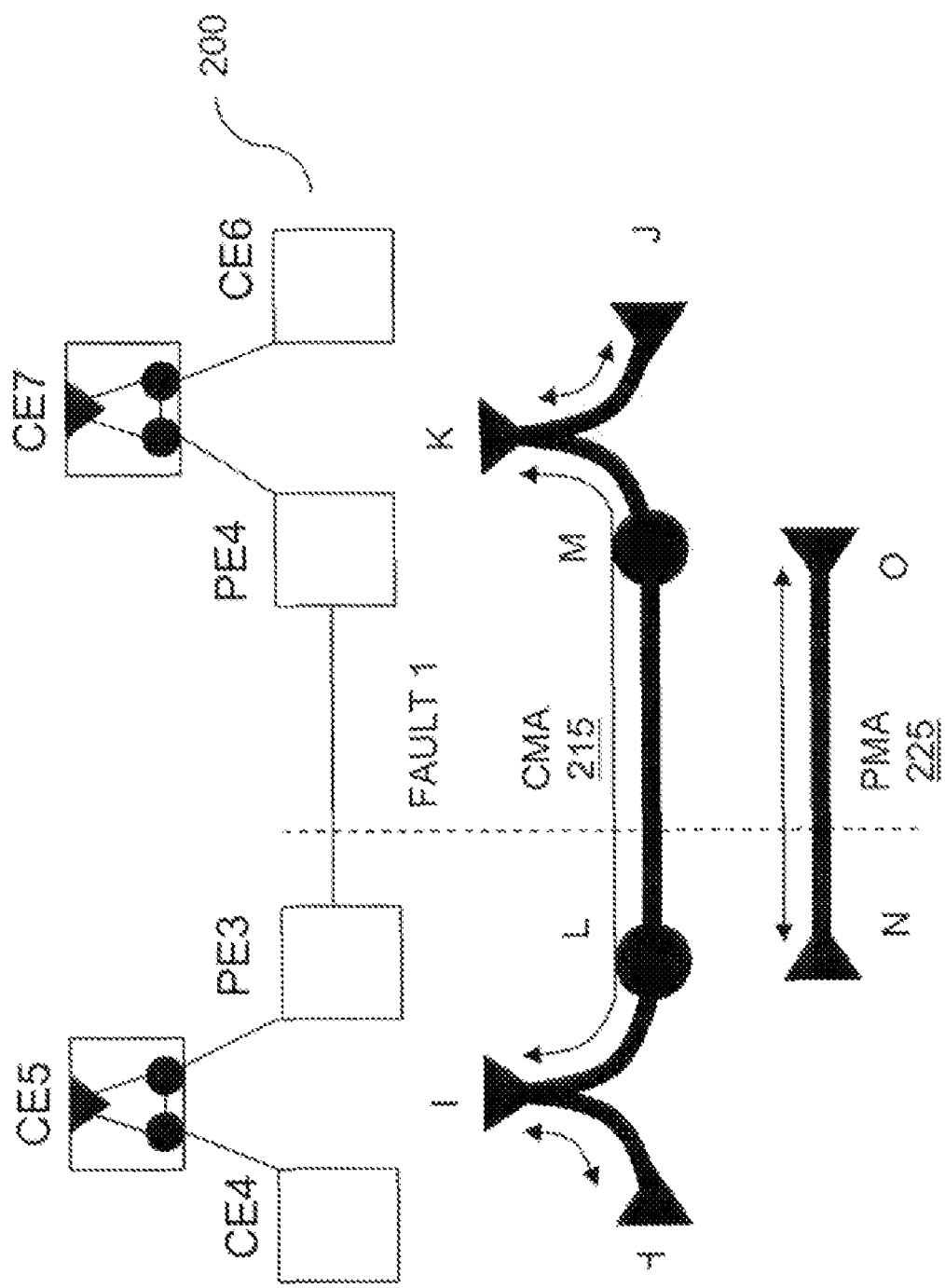
FIG. 4 shows a network running Ethernet CFM in one embodiment of the invention that has experienced an exemplary first fault.

Turning to FIG. 4, network 200 is shown to have experienced a first fault (FAULT 1). A fault may be, for example, a link failure or a fabric failure. FAULT 1 disrupts connectivity between PE3 and PE4 and prevents certain CC frames from being received on CMA 215 and PMA 225. For example, in CMA 215, MEP H and MEP I are unable to receive CC frames from MEP J and MEP K, and vice versa. In PMA 225, MEP N is unable to receive CC frames from MEP O, and vice versa. Failure to receive CC frames within expected times cause MEP to enter a continuity loss state. For example, MEP J enters a continuity loss state after an expected time in which MEP J fails to receive a CC frame from MEP I. In the continuity loss state, MEP J may transmit one or more link trace or loopback frames to other MEP or MIP on CMA 215 to locate the fault with greater accuracy. MEP J may also, under certain circumstances hereinafter discussed, transmit an alarm indication signal (AIS) frame reporting loss of continuity with MEP I and raise an alarm notifying NMS of FAULT 1 through, for example, an SNMP message.

Figure 5:
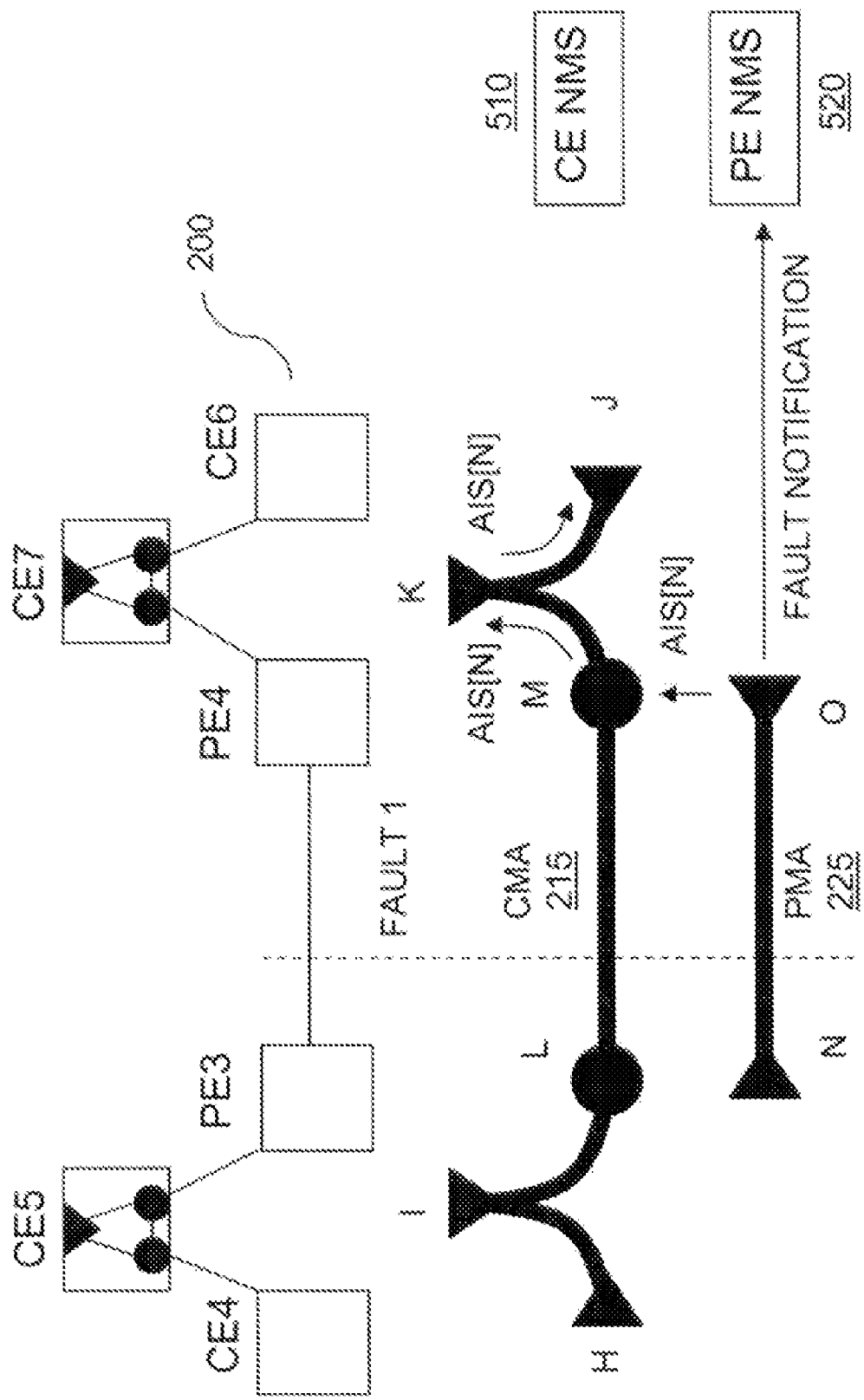
FIG. 5 shows a response to an exemplary first fault in a network running Ethernet CFM in one embodiment of the invention.

Turning to FIG. 5, a path of an AIS frame responsive to FAULT 1 in network 200 is shown in one embodiment. An AIS frame is a message type transmitted selectively by an MEP that has entered a continuity loss state. An AIS frame may be transmitted in the MA of the MEP that detected the continuity loss and in a higher level MA. A MEP in a continuity loss state originates an AIS frame with a lost MEP identifier field (L-MEP ID) identifying the MEP with which continuity has been lost.

In some embodiments, AIS frame transmission proceeds as follows in the example shown in FIG. 5. As a result of FAULT 1, MEP O fails to receive a CC frame from MEP N within an expected time and enters a continuity loss state. In the continuity loss state, MEP O originates an AIS frame with an L-MEP ID identifying MEP N. MEP O reports the fault to PE NMS 520 so that corrective action can be taken. Reporting of the fault to PE NMS 520 may be made, for example, by transmitting an SNMP message to PE NMS 520 identifying FAULT 1. MEP O also transmits the AIS frame to associated higher level MIP M which passively relays the AIS frame to MEP J and MEP K. MEP J and MEP K each analyze the AIS frame and record a continuity loss involving MEP N. For example, in one embodiment, MEP J stores or updates an entry for MEP N in a continuity loss table on CE6 indicating a continuity loss involving MEP N. MEP K does likewise on CE7. Continuity loss tables may be implemented in RAM. It should be noted that in the presence of reachable adjacent maintenance points in PMA 225, MEP O would also have multicast the AIS frame to the adjacent maintenance points.

A further consequence of FAULT 1 is that MEP J fails to receive CC frames from MEP H and MEP I within expected times and enters a continuity loss state. Consider the example of continuity loss between MEP I and MEP J. MEP J first determines whether the continuity loss is the result of a lower level fault. MEP J references its continuity loss table and determines that there has been a reported continuity loss involving lower level MEP N. MEP J next references its reachability table and determines that lower level MEP N resides between itself and MEP I. MEP J thus concludes that the continuity loss is the result of a lower level fault and suppresses an alarm that it would otherwise raise as a result of the continuity loss with MEP I. More particularly, MEP J refrains from reporting FAULT 1 to CE NMS 510. MEP J also refrains from issuing an AIS frame with an L-MEP ID identifying MEP J. It will be appreciated that MEP K follows a similar process resulting in suppression of an alarm that it would otherwise raise resulting from loss of continuity with MEP I, and that MEP J, K follow a similar protocol resulting in suppression of alarms that would otherwise raise resulting from their loss of continuity with MEP H.

Figure 6:
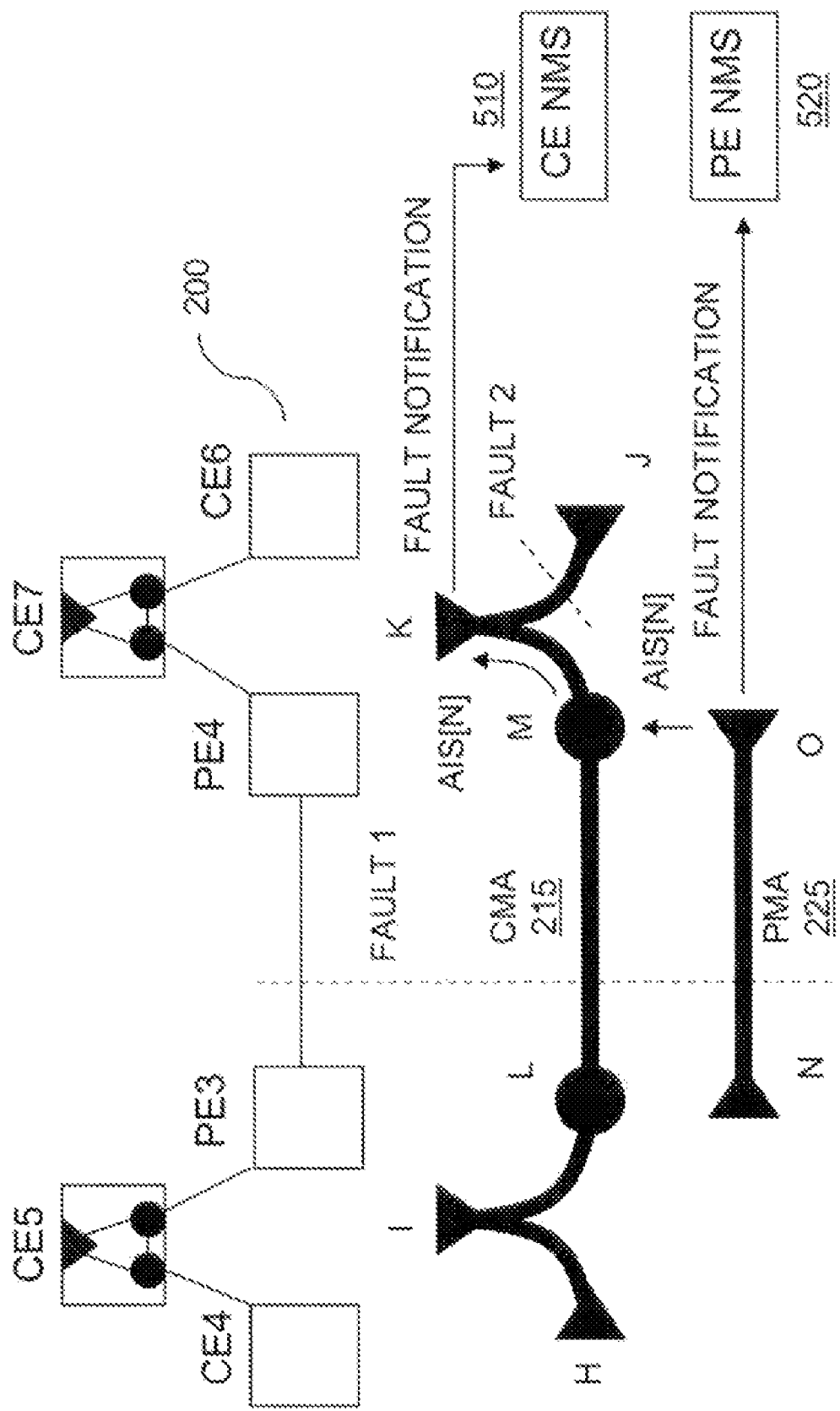
FIG. 6 shows a response to an exemplary second fault in a network running Ethernet CFM in one embodiment of the invention.

Turning to FIG. 6, a response to second fault (FAULT 2) experienced in network 200 is shown in one embodiment. As a result of FAULT 2, MEP K fails to receive a CC frame from MEP J within an expected time and enters a continuity loss state. MEP K first determines whether the continuity loss is the result of a lower level fault. MEP K references its continuity loss table and determines that there has been a reported continuity loss involving lower level MEP N. MEP K then references its reachability table and determines that lower level MEP N does not reside between itself and MEP J. MEP K thus concludes that the continuity loss is not the result of a lower level fault and raises an alarm respecting the continuity loss with MEP J. More particularly, MEP K reports FAULT 2 to CE NMS 510 via, for example, SNMP so that corrective action can be taken. It should be noted that in the presence of reachable adjacent maintenance points in CMA 215 and/or an associated higher level MIP, MEP J would also originate an AIS frame with an L-MEP ID identifying MEP J and multicast the frame to the adjacent maintenance points in CMA 215 and/or the associated higher level MIP.

At this point it should be clear that the alarm suppression strategy described above is both selective in that it suppresses alarms respecting losses of continuity attributable to lower maintenance levels and scalable in that it does not require transmission within a single packet of the identity of multiple nodes that are the object of a reachability relationship. Various modifications of this basic alarm suppression strategy will now be described. Nevertheless, at a fundamental level, the alarm suppression strategy described heretofore is believed to represent a significant advance over the non-selective and non-scalable approaches of the prior art.

Figure 7:
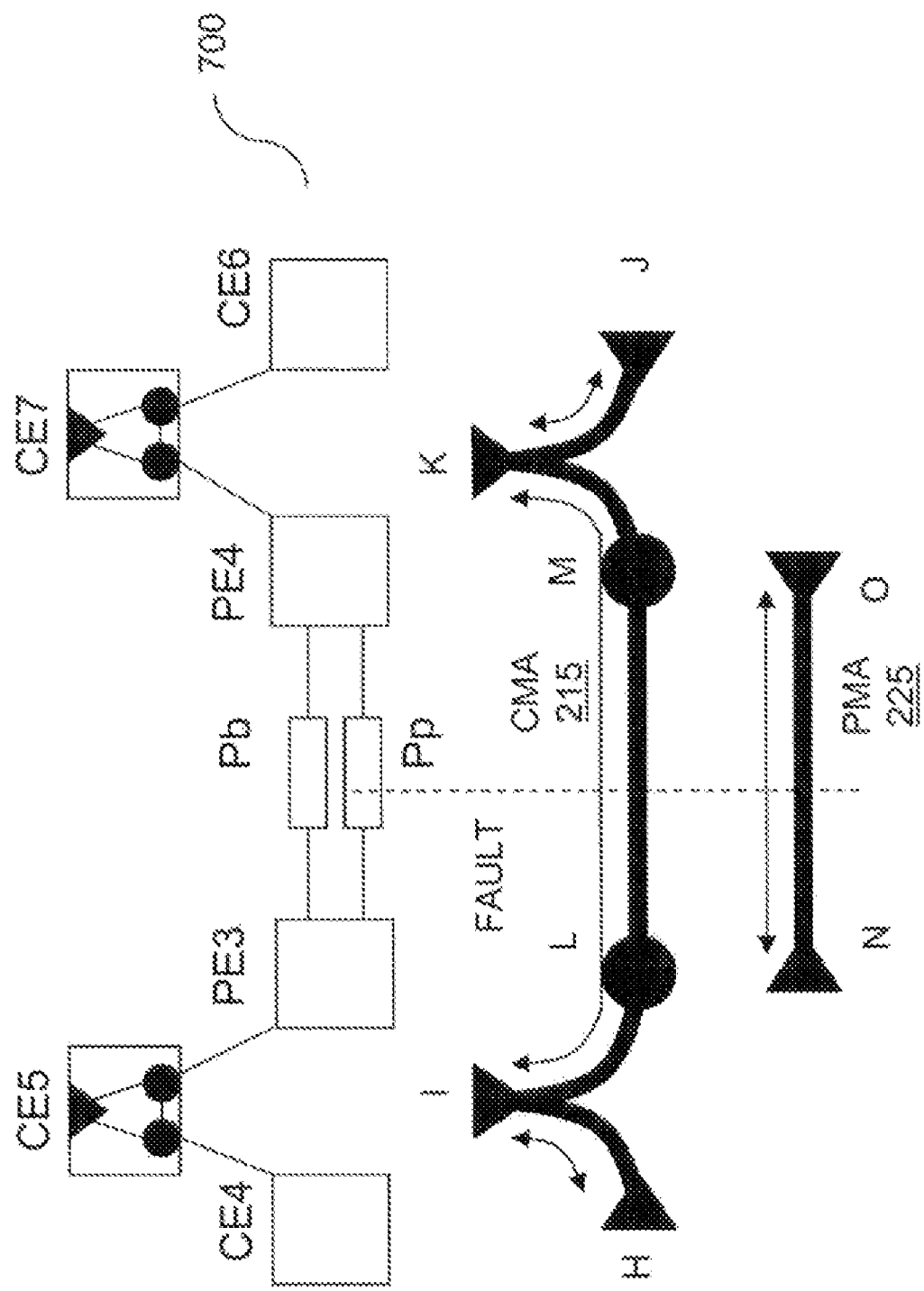
FIG. 7 shows a network running Ethernet CFM and having a protected path in a second embodiment of the invention.
Figure 8:
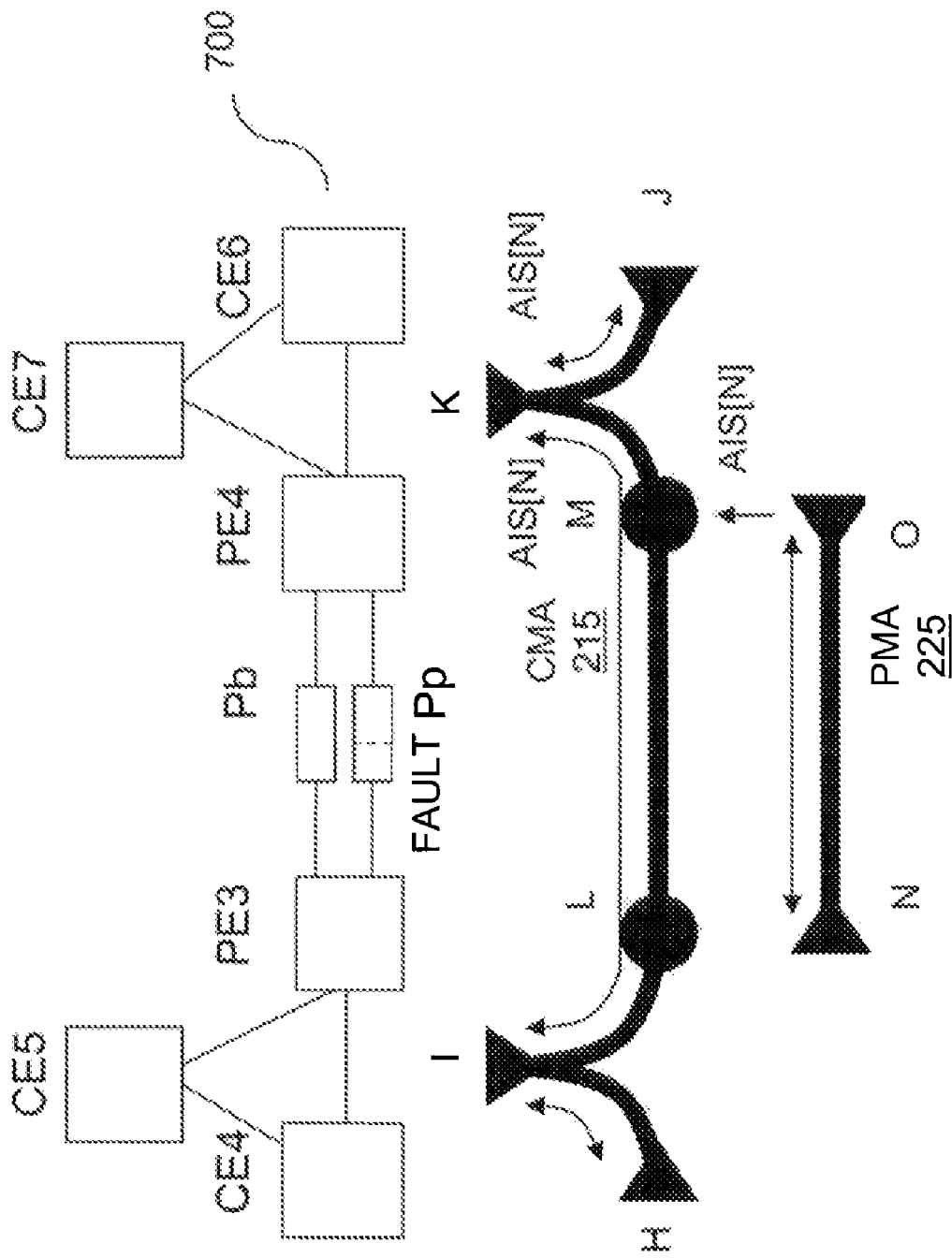
FIG. 8 shows a CC/AIS contradiction in a network running Ethernet CFM and having a protected path in a second embodiment of the invention.

It has been mentioned that an MEP transmits an S-AIS frame when it detects a topology change due to a CC/AIS contradiction. FIGS. 7 and 8 illustrate an exemplary contradiction between a CC frame and an AIS frame indicative of a topology change that prompts transmission of an S-AIS frame.

Turning to FIG. 7, a network 700 running Ethernet CFM and having a protected path is shown in a second embodiment of the invention. Network 700 is similar in configuration to network 200 except that network 700 has primary core provider equipment Pp and backup core provider equipment Pb interposed between provider equipment PE3 and PE4. Initially, PE3 and PE4 are communicatively coupled by Pp. CC frames transmitted between MEP H and MEP I on the one hand and MEP J and MEP K on the other flow through Pp. However, a fault (FAULT) on Pp temporarily disrupts transmission of CC frames.

Turning to FIG. 8, a CC/AIS contradiction arising in network 700 as a result of restoration of communicative coupling between PE3 and PE4 via Pb is shown. FAULT on Pp temporarily disrupts connectivity between PE3 and PE4 and temporarily prevents certain CC frames from being received on CMA 215 and PMA 225. For example, in CMA 215, MEP H and MEP I are unable to receive CC frames from MEP J and MEP K, and vice versa. In PMA 225, MEP N is unable to receive CC frames from MEP O, and vice versa. Failure to receive CC frames within expected times cause MEP to enter a continuity loss state. In the continuity loss state, for example, MEP O originates an AIS frame with an L-MEP ID identifying MEP N. MEP O transmits the AIS frame to associated higher level MIP M which passively relays the AIS frame to MEP J and MEP K. MEP J and MEP K each analyze the AIS frame and record a continuity loss involving MEP N. However, once connectivity between PE3 and PE4 is restored via Pb, CC frames originating from MEP H and MEP I are once again received by MEP J and MEP K. MEP J and MEP K thus detect a contradiction. On the one hand, their continuity loss and reachability tables, considered together, indicate that MEP H and MEP I are unreachable, yet on the other hand they are receiving CC frames from MEP H and MEP I. MEP J and MEP K deduce from this detected contradiction that a topology change has occurred and consequently transmit an S-AIS frame.

One complication with the scalable selective alarm suppression strategy described herein arises when a provider network spans multiple operators. A solution to this complication involving insertion of a stitch maintenance association (SMA) between PMA and an operator maintenance association (OMA) is now explored with reference to FIGS. 9 and 10.

Figure 9:
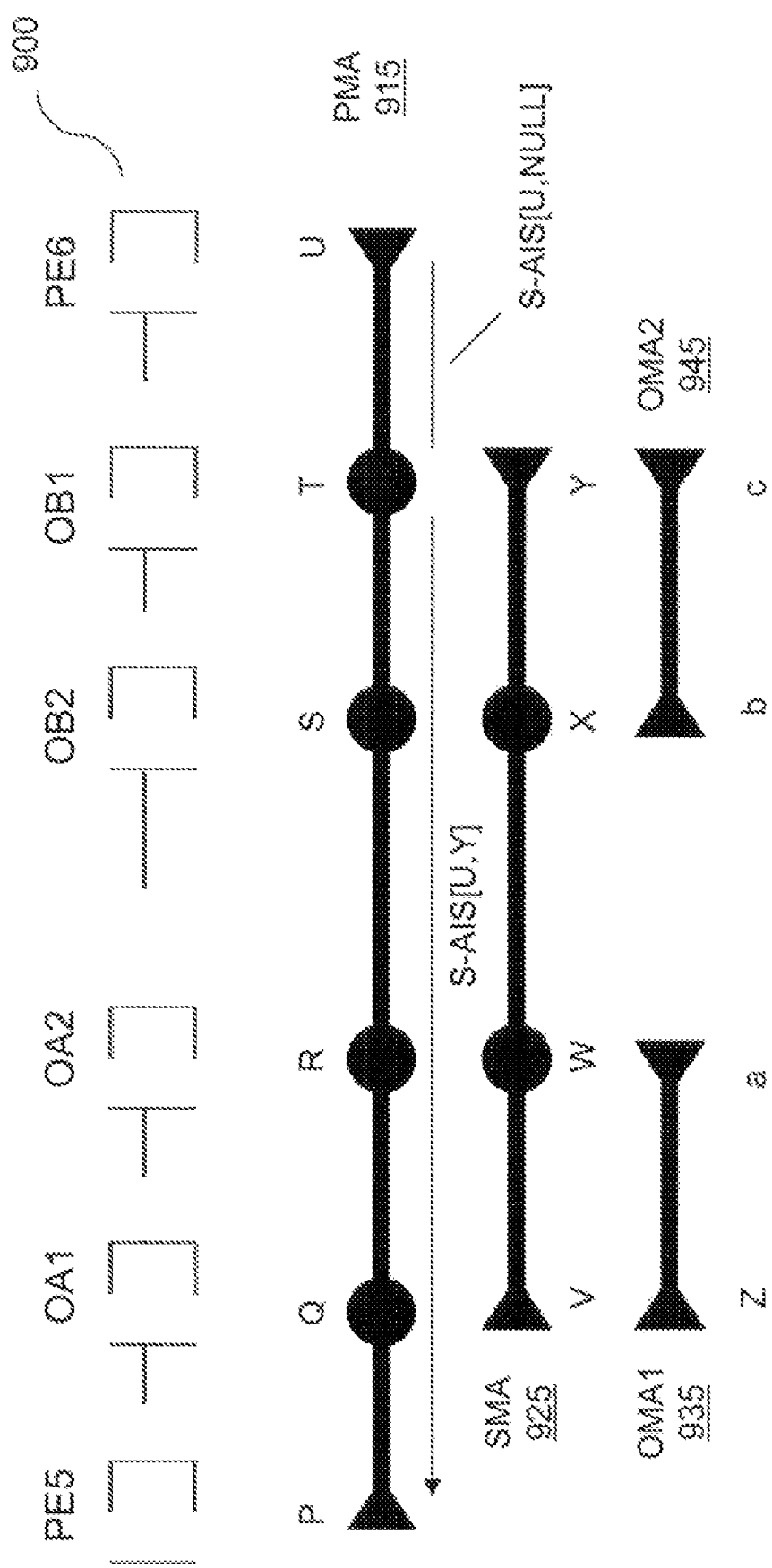
FIG. 9 shows a path of an exemplary S-AIS frame in network running Ethernet CFM and having a stitch maintenance association (SMA) in a third embodiment of the invention.

Turning to FIG. 9, a path of an S-AIS frame in network 900 running Ethernet CFM and having a stitch maintenance association (SMA) 925 is shown in a third embodiment of the invention. Network 900 includes provider equipment PE5, PE6, in a provider network, operator equipment OA1, OA2 in a first operator network and operator equipment OB1, OB2 in a second operator network. The provider and operator equipment are data communication nodes, such as Ethernet switches, that support Ethernet bridging capability. Provider equipment PE5, PE6 is maintained by a service provider.

Operator equipment OA1, OA2 is maintained by a first operator whereas operator equipment OB1, OB2 is maintained by a second operator. The service provider is a customer of the operators. PE5, PE6 communicate through operator equipment OA1, OA2, OB1, OB2. MA are configured at different maintenance levels for performing CFM. Provider maintenance association (PMA) 915 is configured at a provider level to perform CFM in the provider network. A first operator maintenance association (OMA1) 935 is configured at an operator level to perform CFM in the first operator network. A second operator maintenance association (OMA2) 945 is configured at an operator level to perform CFM in the second operator network. PMA 915 includes MEP P, U and MIP Q, R, S, T which are operative on PE5, PE6, OA1, OA2, OB2, OB1, respectively. OMA1 935 includes MEP Z, a operative on OA1, OA2, respectively. OMA2 945 includes MEP b, c operative on OB2, OB1, respectively.

The complication that must be addressed is incomplete correspondence, in the absence of SMA 925, between the lower level MEP reported through S-AIS frames and the higher level MEP reported through AIS frames. For example, in the absence of SMA 925, MEP U would originate an S-AIS frame having an S-MEP ID identifying itself and a B-MEP ID that is initially null. MEP U would transmit the frame to MIP T. MIP T would insert the identity of below MEP c in B-MEP ID and pass the frame to MIP S, which would transmit the frame to MEP P. MEP P would record an entry for MEP U in a reachability table on PE5 indicating that MEP c is resident between MEP P and MEP U. However, MEP P would not learn from S-AIS that MEP a is also resident between MEP P and MEP U. Therefore, if MEP P were to learn of a first continuity loss involving MEP a (through an AIS frame originated by MEP Z, for example) and of a second continuity loss involving MEP U (through failure to receive a CC frame from MEP U within an expected time, for example), MEP P would improperly fail to suppress an alarm for the fault involving MEP U even though the continuity loss with MEP U was attributable to a lower level fault.

Figure 10:
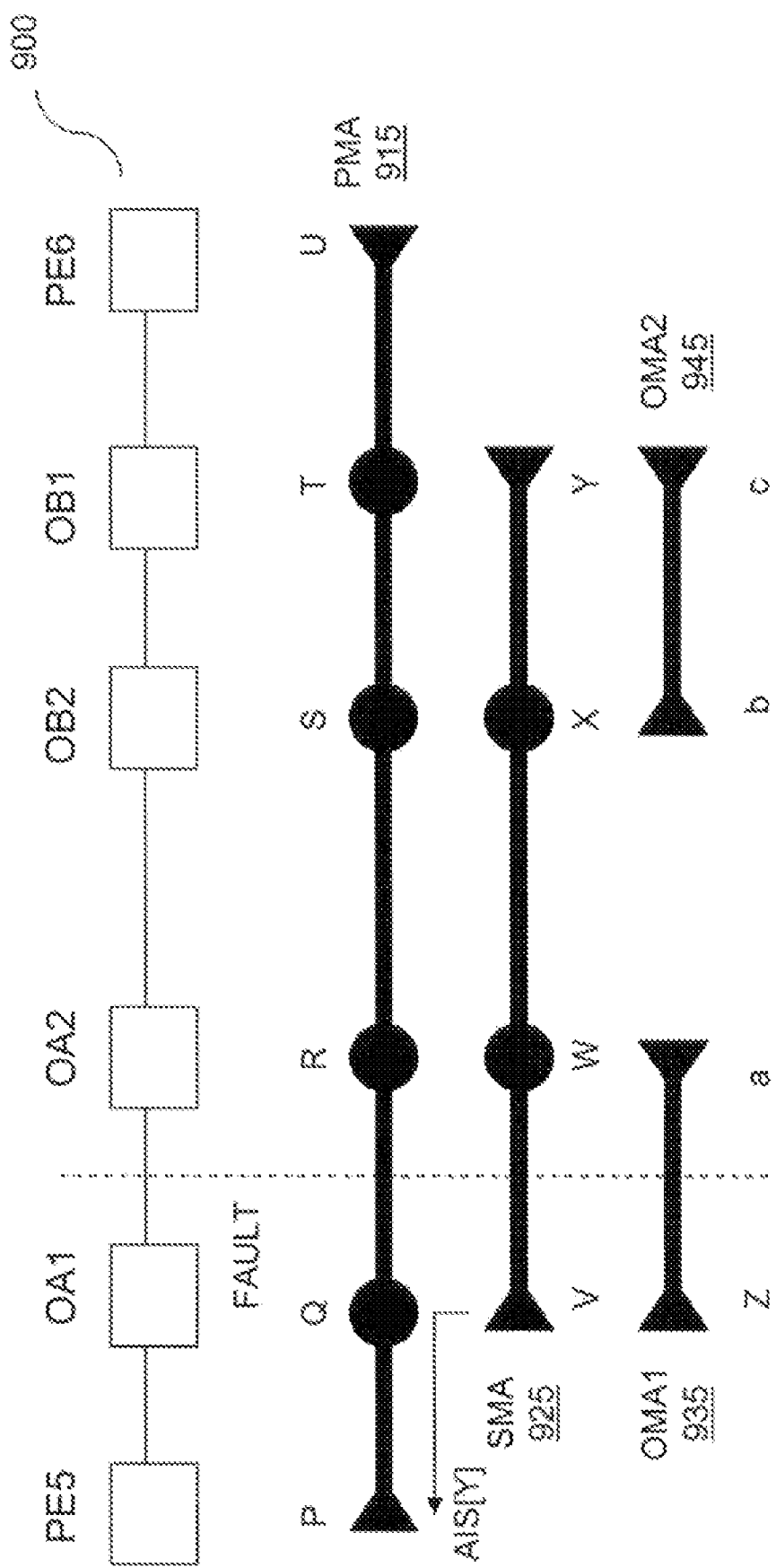
FIG. 10 shows a network running Ethernet CFM and having an SMA in a third embodiment of the invention.

To address this complication, SMA 925 is inserted by a service provider between PMA 915 on the one hand and OMA1 935 and OMA2 945 on the other. SMA 925 is an abstract maintenance level that effectively stitches-together OMA1 935 and OMA2 945 to enable proper coordination between S-AIS and AIS. For example, as shown in FIG. 9 in one embodiment, MEP U originates an S-AIS frame with an S-MEP ID identifying itself and a B-MEP ID that is initially null. MEP U transmits the frame to MIP T. MIP T inserts the identity of MEP Y in B-MEP ID and relays the frame to MEP P. MEP P records an entry for MEP U in a reachability table on PE5 indicating that MEP Y in SMA 925 is resident between MEP P and MEP U. Referring now to FIG. 10, due to insertion of SMA 925 as a layer of abstraction, a continuity loss involving MEP a reported by MEP Z is suppressed in SMA 925. Moreover, if MEP V were to report a continuity loss to MEP P, the AIS frame would identify MEP Y in L-MEP ID. If MEP P were to then detect continuity loss with MEP U, MEP P would reference its reachability table, determine that lower level MEP Y resides between itself and MEP U and conclude that the continuity loss is the result of a lower level fault. MEP P would thus properly suppress the alarm that would otherwise have been raised as a result of the continuity loss with MEP U.

Figure 11:
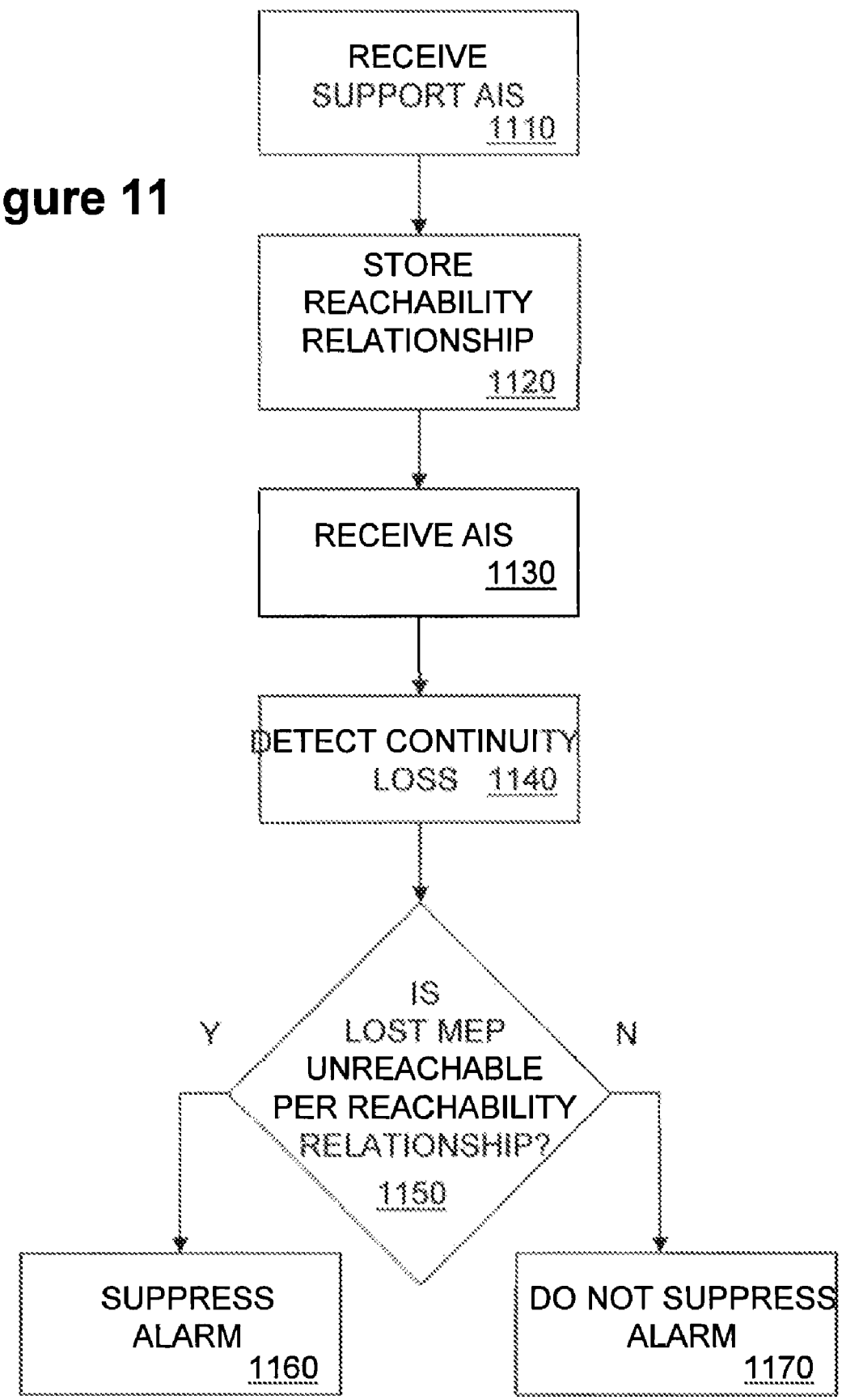
FIG. 11 is a flow diagram showing operation of a maintenance endpoint (MEP) in one embodiment of the invention.

Turning finally to FIG. 11, a flow diagram showing operation of a MEP in one embodiment of the invention is shown. A receiving MEP receives an S-AIS frame from all other same-level MEP (1110). Each S-AIS frame includes the sending MEP in S-MEP ID and either a lower level MEP or a null value in B-MEP ID. The receiving MEP analyzes each S-AIS frame and stores a reachability relationship for the sending MEP (1120). Each reachability relationship associates a sending MEP with a lower level MEP identified in B-MEP ID, if any. In particular, the reachability relationship identifies the lower level MEP as resident between the sending MEP and the receiving MEP. The receiving MEP then receives an AIS frame from a lower level MEP (1130). The AIS frame includes L-MEP ID identifying the lower level MEP with which continuity has been lost. The receiving MEP records the continuity loss. The receiving MEP then detects continuity loss with a same-level MEP (1140) through failure to receive a CC frame from the same-level MEP within an expected time. The receiving MEP then references the reachability table and determines whether the same-level MEP with which continuity has been lost is behind a lower level MEP identified in L-MEP ID (1150). If so, the receiving MEP suppresses an alarm respecting the same-level MEP with which connectivity has been lost (1160). If not, the receiving MEP raises an alarm respecting the same-level MEP (1170).

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come within the meaning and range of equivalents thereof are intended to be embraced therein.

What is claimed is:

1. A method for selective alarm suppression in a data communication network, comprising:
   storing a plurality of reachability relationships between a first maintenance point at a first maintenance level and a respective plurality of second maintenance points at the first maintenance level in response to a respective plurality of first management packets, wherein the reachability relationships associates maintenance points at a second lower maintenance level connected between the first maintenance point and the plurality of second maintenance points;
   detecting by the first maintenance point a first loss of continuity respecting a maintenance point at the second lower maintenance level;
   detecting by the first maintenance point a second loss of continuity respecting one of the plurality of second maintenance points at the first maintenance level; and
   determining by the first maintenance point whether to raise an alarm respecting the second loss of continuity based at least in part on whether the maintenance point at the second lower maintenance level resides between the one of the plurality of second maintenance points and the first maintenance point through referencing the plurality of reachability relationships.

2. The method of claim 1, wherein each of the maintenance points is operative on a data communication node that supports an Ethernet bridging capability.

3. The method of claim 1, wherein the first management packets are Ethernet management frames.

4. The method of claim 1, wherein the respective plurality of management packets identify the first maintenance point and respective ones of the second maintenance points.

5. The method of claim 1, wherein the first loss of continuity is detected based at least in part on a second management packet indicating a loss of continuity.

6. The method of claim 5, wherein the second management packet is an alarm indication signal frame.

7. The method of claim 1, wherein the second loss of continuity is detected based at least in part on a failure to receive a third management packet from the one of the plurality of second maintenance points at the first maintenance level within an expected time.

8. The method of claim 7, wherein the third management packet is a continuity check frame.

9. The method of claim 1, further comprising reporting a fault to a network management system upon determining to raise an alarm.

10. The method of claim 1, further comprising inhibiting reporting of a fault to a network management system upon determining to not raise an alarm.

11. A method for selective alarm suppression in a data communication network, comprising:
receiving from the data communication network a first management packet including a first identity of a first maintenance point at a first maintenance level and a second identity of a second maintenance point at a second maintenance level, wherein the second maintenance level is higher level than the first maintenance level;
storing in a memory a reachability relationship between the first maintenance point and the second maintenance point in response to the first management packet;
receiving from the data communication network a second management packet indicating a first loss of continuity respecting the first maintenance point at the first maintenance level;
detecting a second loss of continuity respecting the second maintenance point based at least in part on failure to receive a third management packet within an expected time; and
determining whether to raise an alarm respecting the second loss of continuity in response to the reachability relationship between the first maintenance point and the second maintenance point.

12. The method of claim 11, wherein the first, second and third management packets are Ethernet management frames.

13. The method of claim 11, wherein the first management packet is received prior to the second management packet.

14. The method of claim 11, wherein the second identity is inserted in the first management packet prior to a transmission of the first management packet from the second maintenance point.

15. The method of claim 11, wherein the first identity and second identity are the sole identities of maintenance points included in the first management packet.

16. The method of claim 11, wherein the second management packet is an alarm indication signal frame.

17. The method of claim 11, wherein the third management packet is a continuity check frame.

18. A data communication node for selectively suppressing alarms in a data communication network, comprising:
an interface adapted to receive a plurality of first management packets;
a memory adapted to store a plurality of reachability relationships between a first maintenance point at a first maintenance level and a respective plurality of second maintenance points at the first maintenance level in response to the respective plurality of first management packets, wherein the reachability relationships associates maintenance points at a second lower maintenance level connected between the first maintenance point and the plurality of second maintenance points;
a management entity adapted to detect a first loss of continuity respecting a maintenance point at the second lower maintenance level and a second loss of continuity respecting one of the plurality of second maintenance points at the first maintenance level and determine whether to raise an alarm respecting the second loss of continuity based at least in part on whether the maintenance point at the second lower maintenance level resides between the one of the plurality of second maintenance points and the first maintenance point by accessing the memory storing the plurality of reachability relationships.

19. A method for facilitating selective alarm suppression in a data communication network, comprising:
receiving by a node in the data communication network a management packet with a first field having an identity of a first maintenance point at a first maintenance level and a second field having a null identity for a maintenance point at a second lower maintenance level;
generating by the node a management packet including the first field having an identity of the first maintenance point at the first maintenance level and a second identity of a second maintenance point in the second field, wherein the second maintenance point is at the second lower maintenance level; and
transmitting by the node the management packet to a third maintenance point adapted to store a reachability relationship between the first maintenance point and the second maintenance point in response to the management packet and use the reachability relationship to determine whether to raise an alarm respecting a loss of continuity with the first maintenance point at the first maintenance level.

* * * * *